US008301902B2

(12) United States Patent
Griffin

(10) Patent No.: US 8,301,902 B2
(45) Date of Patent: Oct. 30, 2012

(54) SYSTEM, METHOD AND PROGRAM PRODUCT FOR COMMUNICATING A PRIVACY POLICY ASSOCIATED WITH A BIOMETRIC REFERENCE TEMPLATE

(75) Inventor: Phillip H. Griffin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 12/370,359

(22) Filed: Feb. 12, 2009

(65) Prior Publication Data

US 2010/0205452 A1 Aug. 12, 2010

(51) Int. Cl.
*G06F 21/00* (2006.01)
*G06F 17/00* (2006.01)
(52) U.S. Cl. ............................................ 713/186; 726/1
(58) Field of Classification Search .................. 713/186; 726/1
See application file for complete search history.

(56) References Cited

U.S. PATENT DOCUMENTS

| | | | |
|---|---|---|---|
| 5,467,081 A | 11/1995 | Drews et al. | |
| 5,649,099 A | 7/1997 | Theimer et al. | |
| 6,044,224 A | 3/2000 | Radia et al. | |
| 6,256,737 B1 * | 7/2001 | Bianco et al. | 713/186 |
| 6,554,188 B1 | 4/2003 | Johnson et al. | |
| 6,836,554 B1 | 12/2004 | Bolle et al. | |
| 7,030,760 B1 | 4/2006 | Brown | |
| 7,062,654 B2 | 6/2006 | Millen et al. | |
| 7,120,607 B2 | 10/2006 | Bolle et al. | |
| 7,298,243 B2 | 11/2007 | Juels et al. | |
| 7,302,583 B2 | 11/2007 | Forrest | |
| 7,310,734 B2 * | 12/2007 | Boate et al. | 713/186 |
| 7,627,895 B2 | 12/2009 | Gifford et al. | |
| 7,671,746 B2 | 3/2010 | Martinez de Velasco Cortina et al. | |

(Continued)

FOREIGN PATENT DOCUMENTS

WO 0065770 11/2000

(Continued)

OTHER PUBLICATIONS

ITU-T Telecommunication Standardization Sector of ITU, X.667, Series X: Data Networks and Open System Communications—OSI networking and system aspects—Naming, Addressing and Registration, ISO/IEC 9834-8: 2005 (E), 34 pages, Geneva, Switzerland 2005.

(Continued)

*Primary Examiner* — Jason K. Gee
*Assistant Examiner* — Teshome Hailu
(74) *Attorney, Agent, or Firm* — Schmeiser, Olsen & Watts; Anna Linne

(57) ABSTRACT

A system, method and program product for communicating a privacy policy associated with a reference template. The method includes assigning a first identifier for identifying a reference template created from biometric data collected, defining a second identifier for identifying a privacy policy that indicates a level of protection to be provided by a relying party requesting access to the reference template, the second identifier including an accept-reject provision for controlling the proper use and handling of the biometric data, cryptographically binding the reference template to the privacy policy and transmitting, responsive to a request received from the relying party, the accept-reject provision for the reference template, where based on a response received from the relying party to the accept-reject provision for the privacy policy, the reference template is either transmitted or not transmitted to the relying party.

25 Claims, 9 Drawing Sheets

U.S. PATENT DOCUMENTS

| | | | |
|---|---|---|---|
| 7,739,744 | B2 | 6/2010 | Burch et al. |
| 7,788,500 | B2 | 8/2010 | Okamura et al. |
| 7,936,905 | B2 | 5/2011 | Takahashi et al. |
| 8,001,387 | B2 | 8/2011 | Lee et al. |
| 8,086,867 | B2 | 12/2011 | Freeman et al. |
| 8,242,892 | B2 | 8/2012 | Griffin |
| 2002/0026582 | A1 | 2/2002 | Futamura et al. |
| 2002/0100803 | A1 | 8/2002 | Sehr |
| 2002/0174010 | A1 | 11/2002 | Rice |
| 2003/0088782 | A1 | 5/2003 | Forrest |
| 2003/0093666 | A1 | 5/2003 | Millen et al. |
| 2003/0097383 | A1 | 5/2003 | Smirnov et al. |
| 2003/0115490 | A1 | 6/2003 | Russo et al. |
| 2003/0126433 | A1 | 7/2003 | Hui |
| 2003/0129965 | A1 | 7/2003 | Siegel |
| 2003/0189094 | A1 | 10/2003 | Trabitz |
| 2004/0019570 | A1 | 1/2004 | Bolle et al. |
| 2004/0020984 | A1 | 2/2004 | Clark |
| 2004/0123114 | A1* | 6/2004 | McGowan .................. 713/186 |
| 2004/0162984 | A1 | 8/2004 | Freeman et al. |
| 2004/0193893 | A1 | 9/2004 | Braithwaite et al. |
| 2005/0005136 | A1 | 1/2005 | Chen et al. |
| 2005/0038718 | A1 | 2/2005 | Barnes et al. |
| 2005/0055582 | A1 | 3/2005 | Bazakos et al. |
| 2005/0088320 | A1 | 4/2005 | Kovach |
| 2005/0180619 | A1 | 8/2005 | McClurg et al. |
| 2005/0198508 | A1 | 9/2005 | Beck |
| 2005/0229007 | A1 | 10/2005 | Bolle et al. |
| 2005/0240778 | A1 | 10/2005 | Saito |
| 2005/0283614 | A1 | 12/2005 | Hardt |
| 2006/0078171 | A1 | 4/2006 | Govindaraju et al. |
| 2006/0090079 | A1 | 4/2006 | Oh et al. |
| 2006/0104484 | A1 | 5/2006 | Bolle et al. |
| 2006/0158751 | A1 | 7/2006 | McClurg et al. |
| 2006/0200683 | A1 | 9/2006 | King |
| 2006/0206723 | A1 | 9/2006 | Gil et al. |
| 2006/0267773 | A1 | 11/2006 | Roque |
| 2006/0289648 | A1 | 12/2006 | Shafer |
| 2007/0040654 | A1 | 2/2007 | Lee et al. |
| 2007/0040693 | A1 | 2/2007 | Medve et al. |
| 2007/0044139 | A1* | 2/2007 | Tuyls et al. .................. 726/2 |
| 2007/0119924 | A1 | 5/2007 | Register, Jr. et al. |
| 2007/0136581 | A1 | 6/2007 | Hoghaug et al. |
| 2007/0164863 | A1 | 7/2007 | Himberger et al. |
| 2007/0180261 | A1 | 8/2007 | Akkermans et al. |
| 2007/0226512 | A1 | 9/2007 | Kevenaar et al. |
| 2007/0243932 | A1 | 10/2007 | Rothschild et al. |
| 2008/0024271 | A1 | 1/2008 | Oberman et al. |
| 2008/0037833 | A1 | 2/2008 | Takahashi et al. |
| 2008/0065895 | A1 | 3/2008 | Liu et al. |
| 2008/0072284 | A1 | 3/2008 | Horvitz et al. |
| 2008/0130882 | A1 | 6/2008 | Hagglund et al. |
| 2008/0157927 | A1 | 7/2008 | Soppera et al. |
| 2008/0162943 | A1 | 7/2008 | Ali et al. |
| 2008/0169909 | A1 | 7/2008 | Park et al. |
| 2009/0022374 | A1 | 1/2009 | Boult |
| 2009/0027207 | A1 | 1/2009 | Shelton et al. |
| 2009/0271635 | A1* | 10/2009 | Liu et al. .................. 713/186 |
| 2010/0201489 | A1 | 8/2010 | Griffin |
| 2010/0201498 | A1 | 8/2010 | Griffin |
| 2010/0205431 | A1 | 8/2010 | Griffin |
| 2010/0205658 | A1 | 8/2010 | Griffin |
| 2010/0205660 | A1 | 8/2010 | Griffin |
| 2010/0332838 | A1 | 12/2010 | Zhu et al. |

FOREIGN PATENT DOCUMENTS

| | | |
|---|---|---|
| WO | WO 2005/122467 | 12/2005 |

OTHER PUBLICATIONS

ITU-T Telecommunication Standardization Sector of ITU, X.667, Series X: Data Networks and Open System Communications—OSI networking and system aspects—Abstract Syntax Notation One (ASN.1), ISO/IEC 8824-1:2003 (E), 146 pages, Geneva, Switzerland 2005.

Griffin, P., ISO 19092: A Standard for Biometric Security Management, ISSA Journal, Jan. 2007, pp. 20-23.

Griffin, P., U.S. Appl. No. 12/370,345, System, Method and Program Product for Associating a Biometric Reference Template With a Radio Frequency Identification Tag, filed on Feb. 12, 2009.

Griffin, P., U.S. Appl. No. 12/370,350, System, Method and Program Product for Recording Creation of a Cancelable Biometric Reference Template in a Biometric Event Journal Record, filed on Feb. 12, 2009.

Griffin, P., U.S. Appl. No. 12/370,365, System, Method and Program Product for Communicating a Privacy Policy Associated With a Radio Frequency Identification Tag and Associated Object, filed on Feb. 12, 2009.

Griffin, P., U.S. Appl. No. 12/370,379, System, Method and Program Product for Generating a Cancelable Biometric Reference Template on Demand, filed on Feb. 12, 2009.

Griffin, P., U.S. Appl. No. 12/370,334, System, Method and Program Product for Checking Revocation Status of a Biometric Reference Template, filed on Feb. 12, 2009.

Berners-Lee, T. et al., Uniform Resource Identifiers (URI): Generic Syntax, RFC 2396, http://ietfreport.isoc.org/rfc/rfc2396.txt, Aug. 1998, pp. 1-40.

Amendment filed Jun. 4, 2012 in response to Office Action (Mail Date Mar. 6, 2012) for U.S. Appl. No. 12/370,334; Filing Date Feb. 12, 2009.

Amendment filed May 24, 2012 in response to Advisory Action (Mail Date May 14, 2012) for U.S. Appl. No. 12/370,345; Filing Date Feb. 12, 2009.

Notice of Allowance (Mail Date May 30, 2012) for U.S. Appl. No. 12/370,345; Filing Date Feb. 12, 2009.

Ratha, et al.; Generating Cancelable Fingerprint Templates; IEEE Transactions on Pattern Analysis and Machine Intelligence; vol. 29, No. 4; Apr. 2007; pp. 561-572.

Molnar, et al.; Privacy for RFID Through Trusted Computing; WPES '05; Nov. 7, 2005; Alexandria, Virginia; pp. 31-34.

Juels, et al.; Soft Blocking: Flexible Blocker Tags on the Cheap; WPES '04; Oct. 28, 2004; Washington, D.C.; pp. 1-7.

Office Action (Mail Date Nov. 1, 2011) for U.S. Appl. No. 12/370,345; Filing Date Feb. 12, 2009.

Amendment filed Jan. 30, 2012 in response to Office Action (Mail Date Nov. 1, 2011) for U.S. Appl. No. 12/370,345; Filing Date Feb. 12, 2009.

Office Action (Mail Date Jul. 13, 2011) for U.S. Appl. No. 12/370,334; Filing Date Feb. 12, 2009.

Amendment filed Sep. 22, 2011 in response to Office Action (Mail Date Jul. 13, 2011) for U.S. Appl. No. 12/370,334, filed Feb. 12, 2009.

Final Office Action (Mail Date Oct. 12, 2011) for U.S. Appl. No. 12/370,334, filed Feb. 12, 2009.

Amendment and Request for Continued Examination filed Jan. 11, 2012 in response to Final Office Action (Mail Date Oct. 12, 2011) for U.S. Appl. No. 12/370,334, filed Feb. 12, 2009.

Office Action (Mail Date Sep. 27, 2011) for U.S. Appl. No. 12/370,379, filed Date Feb. 12, 2009.

Amendment filed Dec. 22, 2011 in response to Office Action (Mail Date Sep. 27, 2011) for U.S. Appl. No. 12/370,379, filed Feb. 12, 2009.

Office Action (Mail Date Nov. 17, 2011) for U.S. Appl. No. 12/370,365, filed Feb. 12, 2009.

Amendment filed Feb. 9, 2012 in response to Office Action (Mail Date Nov. 17, 2011) for U.S. Appl. No. 12/370,365, filed Feb. 12, 2009.

Notice of Allowance (Mail Date Mar. 30, 2012) for U.S. Appl. No. 12/370,365, filed Feb. 12, 2009.

Office Action (Mail Date Mar. 6, 2012) for U.S. Appl. No. 12/370,334, filed Feb. 12, 2009.

Office Action (Mail Date Mar. 13, 2012) for U.S. Appl. No. 12/370,350, filed Feb. 12, 2009.

Final Office Action (Mail Date Mar. 9, 2012) for U.S. Appl. No. 12/370,345, filed Feb. 12, 2009.

Final Office Action (Mail Date May 14, 2012) for U.S. Appl. No. 12/370,379, filed Feb. 12, 2009.

Amendment filed May 8, 2012 in response to Final Office Action (Mail Date Mar. 9, 2012) for U.S. Appl. No. 12/370,345, filed Feb. 12, 2009.
Advisory Action (Mail Date May 14, 2012) for U.S. Appl. No. 12/370,345, filed Feb. 12, 2009.
Amendment filed Jul. 13, 2012 in response to Final Office Action (Mail Date May 14, 2012) for U.S. Appl. No. 12/370,379, filed Feb. 12, 2009.
Amendment filed Jun. 12, 2012 in response to Office Action (Mail Date Mar. 13, 2012) for U.S. Appl. No. 12/370,350, filed Feb. 12, 2009.
Final Office Action (Mail Date Jul. 13, 2012) for U.S. Appl. No. 12/370,350, filed Feb. 12, 2009.
Advisory Action (Mail Date Jul. 26, 2012) for U.S. Appl. No. 12/370,379, filed Feb. 12, 2009.
Request for Continued Examination filed Aug. 14, 2012 for U.S. Appl. No. 12/370,379, filed Feb. 12, 2009.
Notice of Allowance (Mail Date Jul. 26, 2012 for U.S. Appl. No. 12/370,334, filed Feb. 12, 2009.

* cited by examiner

SYSTEM, METHOD AND PROGRAM PRODUCT FOR COMMUNICATING A PRIVACY POLICY ASSOCIATED WITH A BIOMETRIC REFERENCE TEMPLATE

FIELD OF THE INVENTION

The present invention relates to computer systems and software, and more specifically to a technique for communicating a privacy policy associated with data and/or information stored on a biometric reference template corresponding to an individual.

BACKGROUND OF THE INVENTION

Biometric reference templates can be uniquely identified and associated with the identity of a person or individual. The biometric data component of a template is a constant that identifies an individual. Exposure of a reference template over time, when aggregated with other information, provides a footprint of activities that the individual participated in (such as, making a purchase in a store, clocking in and out of work, paying a highway toll) and the locations of that individual at various points in time (such as, when they were at a particular banking machine, toll booth, or store's check-out register). As such, there is a need for indicating a level of protection to be afforded the information contained in a biometric reference template corresponding to a person or individual, to effectively specify the intended and proper use and handling of the information contained in the biometric reference template without compromising the privacy of the individual.

SUMMARY OF THE INVENTION

The present invention resides in a system, method and program product for communicating a privacy policy associated with a biometric reference template belonging to an individual or user, and any information content contained in the biometric reference template, in accordance with an embodiment of the invention. In a first aspect, the invention provides a method for communicating a privacy policy associated with a biometric reference template. The method includes assigning in a first attribute a first identifier for uniquely identifying a biometric reference template created for a type of biometric data collected, defining in a second attribute a second identifier for uniquely identifying a privacy policy that indicates a level of protection to be provided by a relying party requesting access to the biometric reference template, the second identifier includes an accept-reject provision for the privacy policy for controlling the proper use and handling of the biometric data, cryptographically binding the biometric reference template to the privacy policy and transmitting, responsive to a request received from the relying party, the second identifier along with an accept-reject provision for the privacy policy associated with the biometric reference template for controlling the proper use and handling of the biometric data, wherein based on a response received from the relying party to the accept-reject provision for the privacy policy, the biometric reference template is either transmitted or not transmitted to the relying party. The method further includes collecting the biometric data and creating the biometric reference template from the biometric data collected. In an embodiment, the cryptographically binding step further includes forming an association between the second identifier identifying the privacy policy and the first identifier identifying the biometric reference template, each of the first identifier and the second identifier being coupled to the biometric reference template and wherein the association includes at least one of: an external and distinct association between the second identifier identifying the privacy policy and the first identifier identifying the biometric reference template, an appended association between the second identifier identifying the privacy policy and the first identifier identifying the biometric reference template and an inclusive association between the second identifier identifying the privacy policy and the first identifier identifying the biometric reference template. In an embodiment, the transmitting step further includes first ascertaining whether the relying party has accepted the accept-reject provision for the privacy policy referenced by the second identifier before transmitting to the relying party the biometric reference template. In an embodiment, the transmitting step further includes not transmitting the biometric reference template, responsive to a determination that the relying party has not accepted the accept-reject provision for the privacy policy referenced by the second identifier. In an embodiment, each of the first identifier and the second identifier includes at least one of: an information object identifier (OID), a universally unique identifier (UUID), a uniform resource identifier (URI), a cryptographic hash of the privacy policy and a digital signature associated with the privacy policy. In an embodiment, the second identifier is cryptographically bound to the biometric reference template includes at least one of: a hash, a digital signature, a message authentication code (MAC) and encryption.

In another aspect, the invention provides a computer system for associating a biometric reference template with a privacy policy. The computer system includes first program instructions to assign in a first attribute a first identifier for uniquely identifying a biometric reference template created for a type of biometric data collected, second program instructions to define in a second attribute a second identifier for uniquely identifying a privacy policy that indicates a level of protection to be provided by a relying party requesting access to the biometric reference template, the second identifier includes an accept-reject provision for the privacy policy for controlling dissemination and usage of the biometric data collected, third program instructions to cryptographically bind the biometric reference template to the privacy policy and fourth program instructions to transmit, responsive to a request received from the relying party, the second identifier along with an accept-reject provision for the privacy policy associated with the biometric reference template for controlling the proper use and handling of the biometric data, wherein based on a response received from the relying party to the accept-reject provision for the privacy policy, the biometric reference template is either transmitted or not transmitted to the relying party, a computer readable storage medium, the computer readable storage medium storing each of the first, second, third and fourth program instructions and a central processing unit for executing each of the first, second, third and fourth program instructions. In an embodiment, the first program instructions include instructions to collect the biometric data and to create the biometric reference template from the biometric data collected. In an embodiment, the third program instructions include instructions to form an association between the second identifier identifying the privacy policy and the first identifier identifying the biometric reference template, each of the first identifier and the second identifier being coupled to the biometric reference template. In an embodiment, the association includes at least one of: an external and distinct association between the second identifier identifying the privacy policy and the first identifier identifying the biometric reference template, an appended association between the second identifier identifying the privacy policy and the first identifier identifying the biometric reference template and an inclusive association between the second identifier identifying the privacy policy and the first identifier identifying the biometric reference template. In an embodiment, the fourth program instructions include instructions to first ascertain whether the relying party has accepted the accept-reject provision for the privacy policy referenced by the second identifier before transmitting to the relying party the biometric reference template and where responsive to a determination that the relying party has not accepted the accept-reject provision for the privacy policy referenced by the second identifier, not transmitting the biometric reference template. In an embodiment, each of the first identifier and the second identifier includes at least one of: an information object identifier (OID), a universally unique identifier (UUID), a uniform resource identifier (URI), a cryptographic hash of the privacy policy and a digital signature associated with the privacy policy and wherein the second identifier is cryptographically bound to the biometric reference template includes at least one of: a hash, a digital signature, a message authentication code (MAC) and encryption.

In another aspect of the invention, the invention provides a computer program product for controlling dissemination and use of biometric data. The computer program product includes a computer readable storage medium, first program instructions to assign in a first attribute a first identifier for uniquely identifying a biometric reference template created for a type of biometric data collected, second program instructions to define in a second attribute a second identifier for uniquely identifying a privacy policy that indicates a level of protection to be provided by a relying party requesting access to the biometric reference template, the second identifier includes an accept-reject provision for the privacy policy for controlling dissemination and usage of the biometric data collected, third program instructions to cryptographically bind the biometric reference template to the privacy policy and fourth program instructions to transmit, responsive to a request received from the relying party, the second identifier along with an accept-reject provision for the privacy policy associated with the biometric reference template for controlling the proper use and handling of the biometric data, wherein based on a response received from the relying party to the accept-reject provision for the privacy policy, the biometric reference template is either transmitted or not transmitted to the relying party and wherein the first, second, third and fourth program instructions are recorded on the computer readable storage medium. In an embodiment, the first program instructions include instructions to collect the biometric data and to create the biometric reference template from the biometric data collected. In an embodiment, the third program instructions include instructions to form an association between the second identifier identifying the privacy policy and the first identifier identifying the biometric reference template, each of the first identifier and the second identifier being coupled to the biometric reference template. In an embodiment, the association includes at least one of: an external and distinct association between the second identifier and the biometric reference template, an appended association between the second identifier and the biometric reference template and an inclusive association between the second identifier and the biometric reference template. In an embodiment, the fourth program instructions include instructions to first ascertain whether the relying party has accepted the accept-reject provision for the privacy policy referenced by the second identifier before transmitting to the relying party the biometric reference template and wherein responsive to a determination that the relying party has not accepted the accept-reject provision for the privacy policy referenced by the second identifier, not transmitting the biometric reference template. In an embodiment, the second identifier includes at least one of: an information object identifier (OID), a universally unique identifier (UUID), a uniform resource identifier (URI), a cryptographic hash of the privacy policy and a digital signature associated with the privacy policy.

In yet another embodiment, the invention provides a process for deploying computing infrastructure includes integrating computer-readable code into a computing system, wherein the code in combination with the computing system is capable of performing a process for controlling dissemination and use of biometric data. The process includes collecting the biometric data, creating the biometric reference template from the biometric data collected, assigning in a first attribute a first identifier for uniquely identifying the biometric reference template created for a type of biometric data collected, defining in a second attribute a second identifier for uniquely identifying a privacy policy that indicates a level of protection to be provided by a relying party accessing biometric data in the biometric reference template, the second identifier includes an accept-reject provision for the privacy policy for controlling proper use and handling of the biometric data, cryptographically bind the biometric reference template to the privacy policy and transmitting, responsive to a request received from the relying party, the second identifier along with an accept-reject provision for the privacy policy associated with the biometric reference template for controlling the proper use and handling of the biometric data, wherein based on a response received from the relying party to the accept-reject provision for the privacy policy, the biometric reference template is either transmitted or not transmitted to the relying party. In an embodiment, the cryptographically binding step further includes forming an association between the second identifier identifying the privacy policy and the first identifier identifying the biometric reference template, each of the first identifier and the second identifier being coupled to the biometric reference template and wherein the association includes at least one of: an external and distinct association between the second identifier identifying the privacy policy and the first identifier identifying the biometric reference template, an appended association between the second identifier identifying the privacy policy and the first identifier identifying the biometric reference template and an inclusive association between the second identifier identifying the privacy policy and the first identifier identifying the biometric reference template. In an embodiment, the transmitting step further includes first ascertaining whether the relying party has accepted the accept-reject provision for the privacy policy referenced by the second identifier before transmitting to the relying party the biometric reference template and responsive to a determination that the relying party has not accepted the accept-reject provision for the privacy policy referenced by the second identifier, not transmitting the biometric reference template. In an embodiment, each of the first identifier and the second identifier includes at least one of: an information object identifier (OID), a universally unique identifier (UUID), a uniform resource identifier (URI), a cryptographic hash of the privacy policy and a digital signature associated with the privacy policy. In an embodiment, the second identifier is cryptographically bound to the biometric reference template includes at least one of: a hash, a digital signature, a message authentication code (MAC) and encryption.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1:
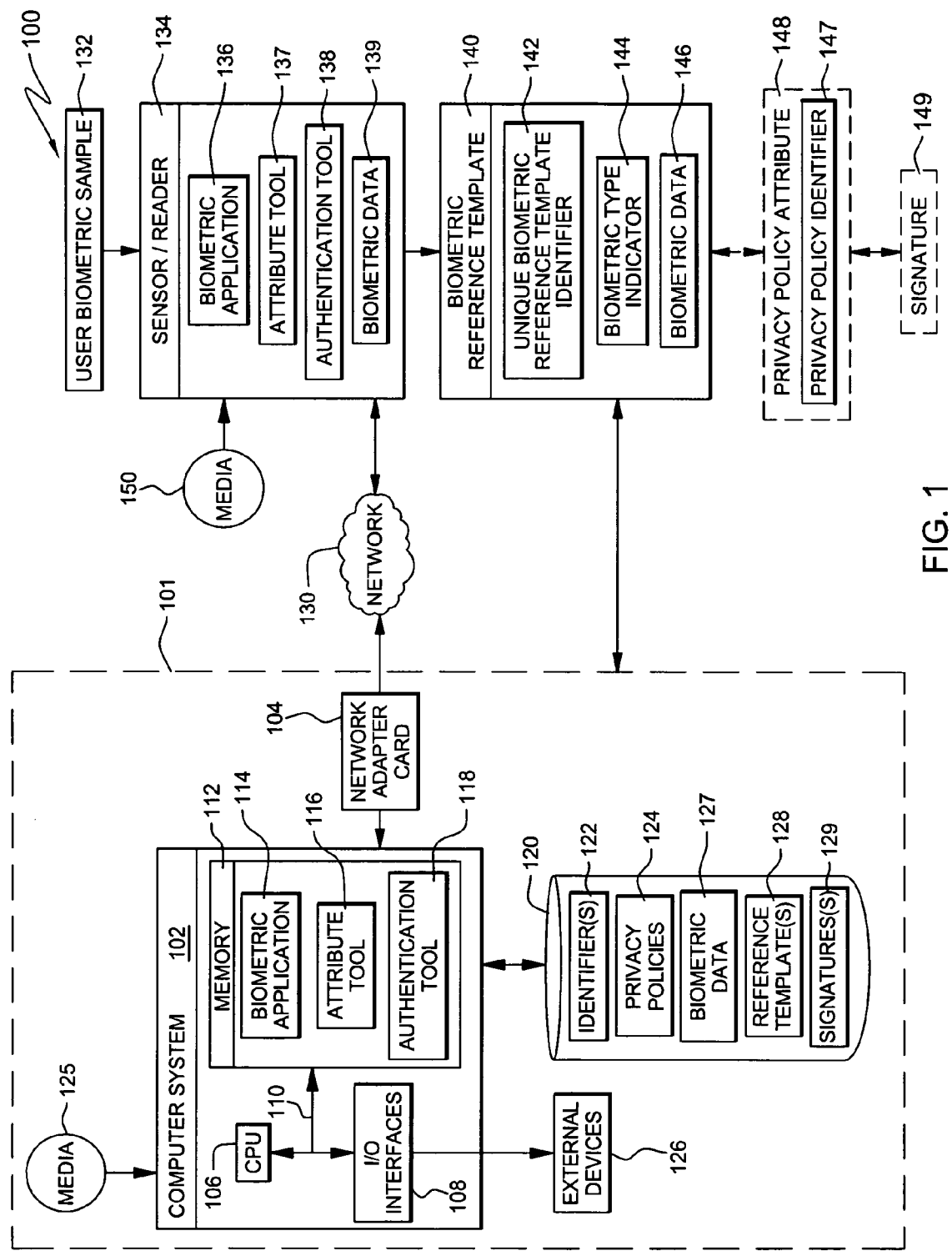
FIG. 1 is a block diagram depicting an embodiment of a biometric computer infrastructure for creating a biometric reference template for an individual or user using a biometric sample collected from the individual, and associating with the biometric reference template created, a privacy policy attribute that identifies a privacy policy that specifies the intended and proper handling and use of the information contained in the biometric reference template, in accordance with an embodiment of the present invention.

In one embodiment, the invention provides a biometric infrastructure 100 that includes a computer system 102 for creating a biometric reference template, and associating with the biometric reference template, a privacy policy attribute that identifies a privacy policy that specifies the intended and proper handling and use of the information contained in the biometric reference template, in accordance with an embodiment of the invention. Referring to FIG. 1, the computer system or server 102 is shown to include a CPU (Central Processing Unit) 106, a memory 112, a bus 110, and input/output (I/O) interfaces 108. Further, the server 102 is shown in communication with external I/O devices/resources 126 and storage system 120. In general, CPU 106 executes computer program code stored in memory 112, such as the biometric application 114 for processing biometric data contained in a biometric sample 132. In an embodiment, the biometric application 114 deployed on the computer system 102 is loaded into memory 112 of the computer system 102 from a computer readable storage medium or media (reference numeral 125), such as, a magnetic tape or disk, optical media, DVD, memory stick, semiconductor memory, etc. or downloaded from the server via a network adapter card (reference numerals 104) installed on the computer system or server 102. Further, the memory 112 stores an attribute tool 116 for creating or defining one or more attributes to be included in the biometric reference template (also referred to herein as simply "biometric reference template" or "reference template" or "base template" or "base reference template") that is created using an individual's biometric sample, and memory 112 stores an authentication tool 118 for signing biometric reference templates and/or attributes associated with the biometric reference templates. In an embodiment, the biometric reference template 140 that is created using a biometric sample 132 collected from an individual is stored in the database 120 (shown as reference numeral 128) within computer system or server 102. In an embodiment, one or more identifier(s) 122, for instance, biometric reference template identifiers that uniquely identify respective biometric reference templates 128 are stored in storage 120. Further, in an embodiment, any privacy policies to be associated with one or more biometric reference templates are stored as reference numeral 124 in database 120. Additionally, any biometric data 139 and/or information processed by the biometric sensor or reader device 134 are transmitted over a network 130 to the computer system or server 102 for storage as biometric data 127 in storage 120. In particular, as shown in FIG. 1, a user or individual provides a biometric sample 132 using a biometric sensor or a biometric reader or scanning device 134 coupled to the computer system 102. In an embodiment, the biometric sensor or reader or scanner 134 converts the scanned user biometric sample 132 to a digital form using an instance 136 of the biometric application 114. In an embodiment, an instance 136 of the biometric application 114 deployed on the computer system 102 is loaded into the sensor or reader device 134 within the biometric infrastructure 100 from a computer readable storage medium or media (reference numeral 150), such as, a magnetic tape or disk, optical media, DVD, memory stick, semiconductor memory, etc. or downloaded from the server via a network adapter card (reference numerals 104) installed on the computer system or server 102. Similarly, an instance 137 of the attribute tool 116 and an instance 138 of the authentication tool 118 is loaded into the sensor or reader device 134 within the biometric infrastructure 100 from a computer readable storage medium or media (reference numeral 150), such as, a magnetic tape or disk, optical media, DVD, memory stick, semiconductor memory, etc. or downloaded from the server via a network adapter card (reference numerals 104) installed on the computer system or server 102. In particular, the instance 136 of the biometric application 114 loaded into the biometric sensor or reader device 134 is used to process the biometric sample 132 collected from a person or an individual or user into biometric data 139, which, in an embodiment, is stored within the biometric sensor or reader device 134. Further, the biometric data 139 processed by the sensor or reader device 134 is used to create a biometric reference template 140. In an embodiment, the sensor or reader device 134 uses the attribute tool or program 137 for creating one or more attributes to be associated with or attached to the biometric reference template 140. Further, the sensor or reader device 134 uses the authentication tool or program 138 for signing the biometric reference template 140 that is created. In an embodiment, the signature 149 associated with the biometric reference template 140 is stored in database 120 as reference numeral 129. Further, the authentication tool 138 is used to sign any attributes that are associated with and/or included in a biometric reference template 140. In an embodiment, the base biometric reference template 140 created is assigned a unique biometric reference template identifier 142 (also referred to herein simply as "template identifier") for uniquely identifying the biometric reference template 140 created using a person's biometric data 139 that is processed from the person's biometric sample 132. In an embodiment, the unique base template identifier 142 is created in the form of an information object identifier (OID) as defined in ISO/IEC 8824-1 and ISO/IEC 9834-8, a universally unique identifier (UUID) as defined in ISO/IEC 9834-8, or a uniform resource identifier (URI) as defined in RFC 2396. Further, in an embodiment, the biometric data 139 that is processed using a biometric sample 132 provided by an individual is associated with the base biometric reference template 140 and is included in the biometric reference template 140 itself, shown as base biometric data 146. In an embodiment, the biometric data 146 stored within the biometric reference template 140 is encrypted or protected in some manner, such as signing the entire biometric reference template 140, as discussed further herein below. The digital signature (reference numeral 149) for the biometric reference template 140 is shown in dotted lines to imply that the signature 149 is detached from the biometric reference template 140. However, it will be understood by one skilled in the art that the signature 149 may be appended to the biometric reference template 140. In an embodiment, the biometric reference template 140 includes a component "biometric type indicator" (reference numeral 144) that provides an indication of the type of biometric data used to create the biometric reference template, for example, a fingerprint, iris or retinal scan, etc. Further, as shown in FIG. 1, a privacy policy attribute 148, created using the attribute tool 137 is associated with the biometric reference template 140. In an embodiment, the privacy policy attribute 148 includes a unique privacy policy identifier (reference numeral 147) that identifies a privacy policy that is associated with the biometric reference template 140, such that, the privacy policy informs a recipient of the intended and proper handling and use of the information contained in the biometric reference template 140. In an embodiment, the base biometric reference template 140 that is created using a biometric sample 132 provided by a user is stored in database 120 within the computer system 102 along with other base biometric reference templates 128 created for other users or individuals within the computer system. In an embodiment, the biometric data of each of the base biometric reference templates 128 stored within database 120 within the computer system 102 is encrypted to protect the identities of the individuals that the biometric reference templates 128 belong to. Further, in an embodiment, each of the base biometric reference templates 128 is signed with a digital signature 129 before being stored in the database 120, as discussed further herein below. It should be understood, however, that although not shown, other hardware and software components (e.g., additional computer systems, routers, firewalls, etc.) could be included in infrastructure 100.

Figure 2:
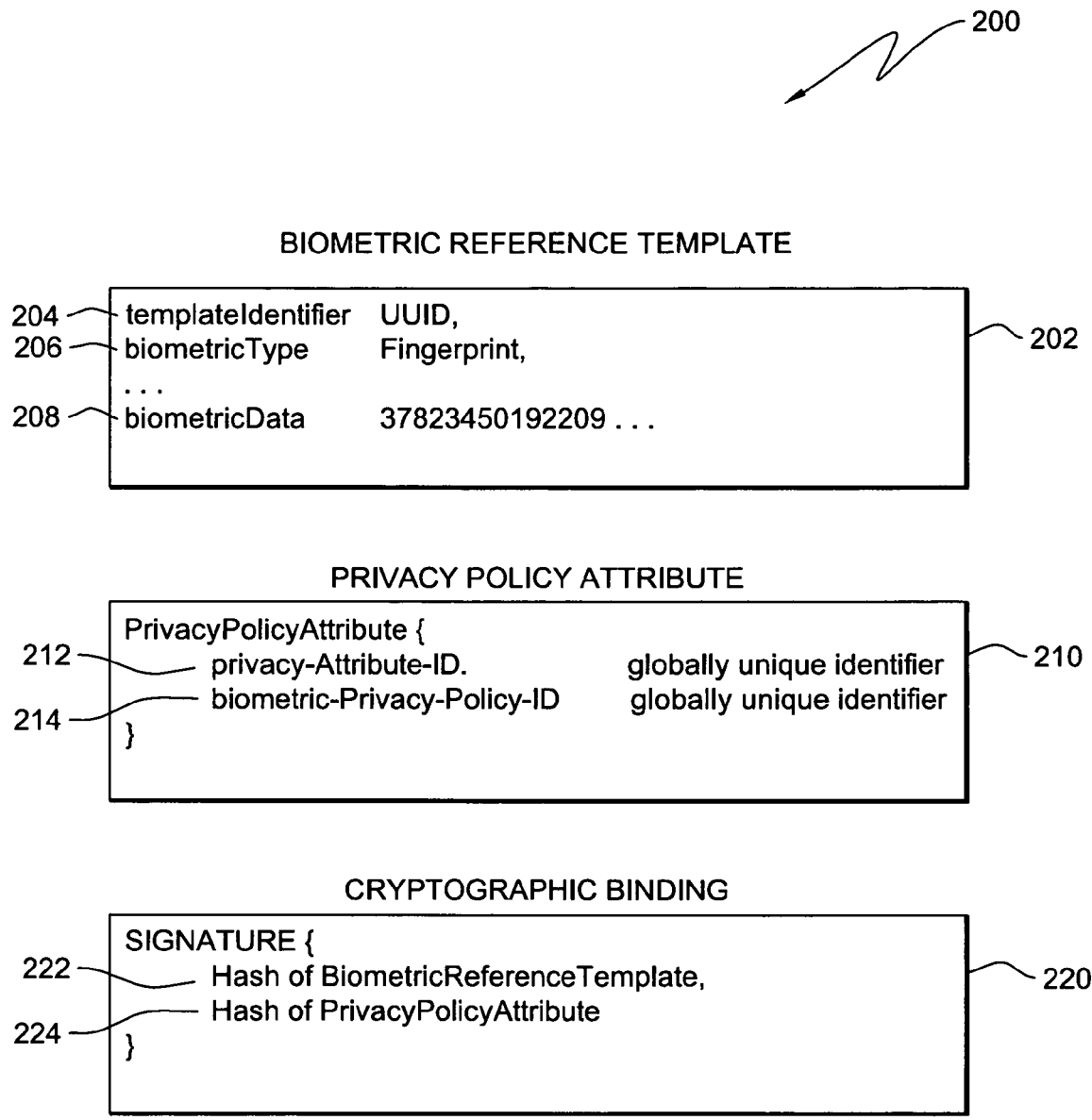
FIG. 2 is a block diagram depicting an embodiment of a biometric reference template that is associated with a privacy policy attribute that identifies a privacy policy that specifies the intended and proper handling and use of the information contained in the biometric reference template, in accordance with an embodiment of the present invention.
Figure 3:
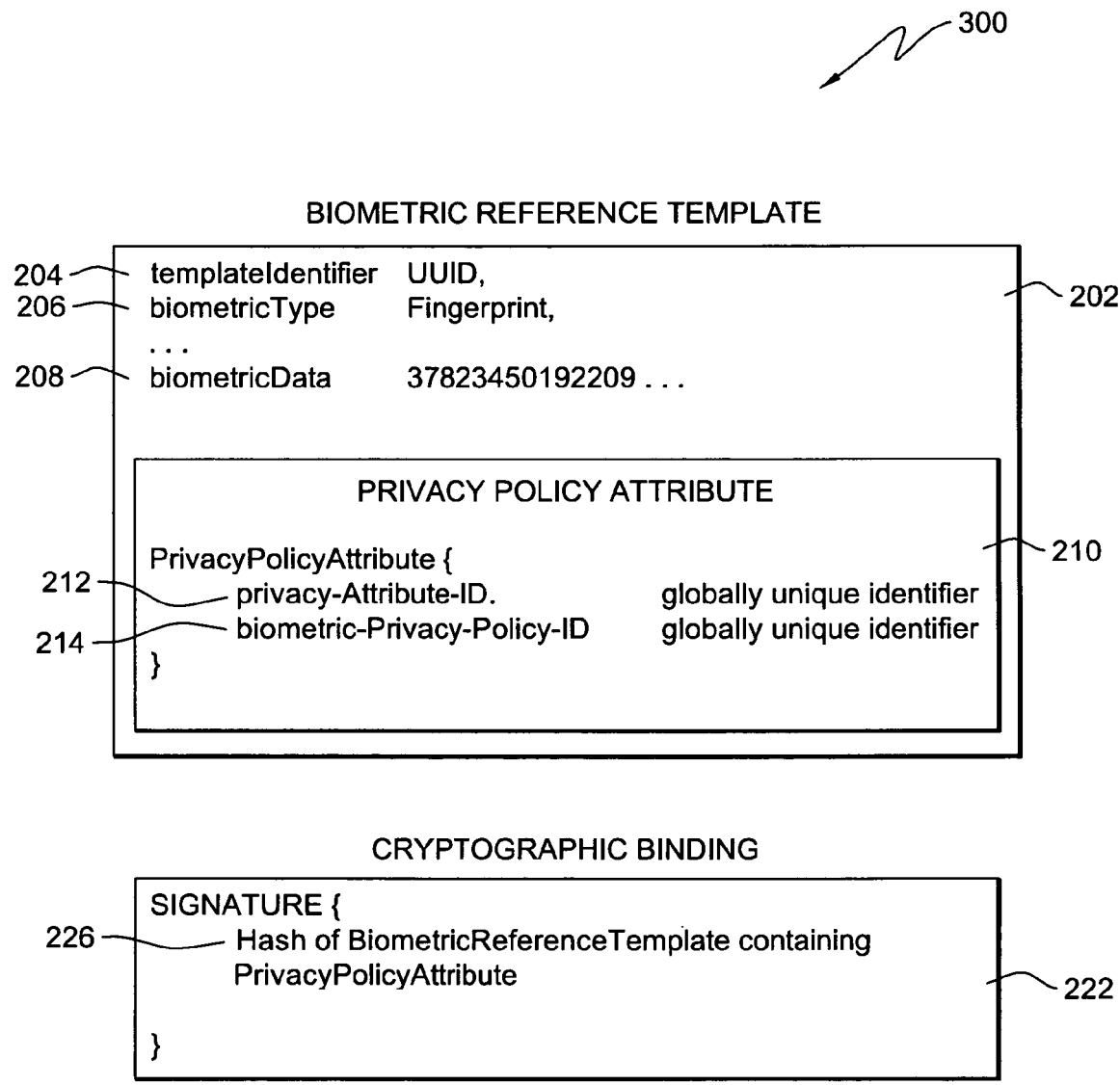
FIG. 3 is a block diagram depicting another embodiment of a biometric reference template that includes a privacy policy attribute as part of the biometric reference template information that identifies a privacy policy that specifies the intended and proper handling and use of the information contained in the biometric reference template, in accordance with an embodiment of the present invention.

Reference is now made to FIGS. 2 and 3, reference numeral 200 and 300, respectively, which depict elements or components of a biometric reference template that further has associated with it a privacy policy attribute for identifying a privacy policy that specifies the intended and proper handling and use of the information contained in the biometric reference template, in accordance with respective embodiments of the present invention. In particular, FIG. 2, reference numeral 200, shows an embodiment where the biometric reference template is associated with a privacy policy attribute, whereas, FIG. 3, reference numeral 300, shows an embodiment where the privacy policy attribute associated with the biometric reference template is included within the biometric reference template itself. As such, components in FIG. 3 that are the same components as shown in FIG. 2 are labeled with the same reference numerals. Referring to FIG. 2, in an embodiment, the biometric reference template 202 comprises a "templateIdentifier" component (reference numeral 204) that contains a unique biometric reference template identifier (also referred to herein as "biometric reference template identifier" or "biometric identifier" or "template identifier") that uniquely identifies a biometric reference template belonging to a particular individual. Further, in an embodiment, the biometric reference template 202 contains a "biometricType" component (reference numeral 206) that identifies the type of biometric sample collected from the individual, such as, a fingerprint, retinal scan, etc. In addition, in an embodiment, the "biometricData component (reference numeral 208) contains biometric data that is processed from the biometric sample collected from an individual. Further, in an embodiment, the biometric reference template 202 has associated with it a privacy policy attribute 210, which is a generic information object that contains two unique information object identifier (OID) values. The first identifier identifies the attribute as a privacy policy attribute, as opposed to some other type of attribute and the second identifier identifies the type of content carried in the information object, namely, a biometric privacy policy. In an embodiment, the privacy_Attribute-ID 212 is a globally unique identifier that identifies the type of attribute as a privacy policy attribute and where the biometric_Privacy-Policy-ID 214 is also a globally unique identifier that identifies the type of attribute as a privacy policy attribute and indicates the type of content carried in the attribute, namely, that the content is a biometric privacy policy. In an embodiment, the biometric_Privacy-Policy-ID 214 identifies an information object that can comprise a document, a web page, or perhaps a law. The privacy policy identifier 214 can be created in the form of an information object identifier (OID) as defined in ISO/IEC 8824-1 and ISO/IEC 9834-8, a universally unique identifier (UUID) as defined in ISO/IEC 9834-8, a uniform resource identifier (URI) as defined in RFC 2396, a cryptographic hash of a biometric privacy policy, a digital signature over the privacy policy, or some other means of uniquely naming the privacy policy. When OIDs, UUIDs, or URIs are used, these indicators can be included in the biometric privacy policy attribute information. Further, as shown in FIG. 2, the unique template identifier 204 identifying the biometric reference template 202 is cryptographically bound to the privacy policy attribute 210 using a digital signature or a cryptographic binding 220. In particular, a hash or hash value (reference numeral 222) is first computed over the biometric reference template identifier (reference numeral 204) identifying the biometric reference template 202 and a hash value (reference numeral 224) is computed over the privacy policy attribute (reference numeral 210). Then, any of a number of algorithms can be used to sign the respective hash values 222 and 224. In an embodiment, a RSA digital signature scheme 220 is used to sign the biometric reference template, such that, the digital signature provides integrity protection over the entire biometric reference template. As such, a digital signature 220 can be used to detect if any of the biometric reference template information has been tampered with. In particular, the act of digitally signing the entire biometric reference template cryptographically binds every component within the biometric reference template together. Further, if the biometric reference template contains any attributes, then such attributes are also cryptographically bound to the biometric reference template. In an embodiment, to form a digital signature on an information object, such as, a biometric reference template, a cryptographic hash (also referred to herein as "encrypted hash" or "hash value" or simply "hash") is computed over the entire object or biometric reference template and then the hash is signed. For instance, where a RSA digital signature scheme is used to sign a biometric reference template, a key is used to encrypt the hash to form the digital signature. Furthermore, in an embodiment, the signed biometric reference template is stored along with the digital signature in a database, for instance, database 120. However, the signed biometric reference template and the digital signature may be stored separately within the computer system 100. Furthermore, the digital signature may be detached from the biometric reference template or may be attached or coupled to the biometric reference template. The use of digital signatures to sign objects to be authenticated is well known in the art and, as such, will not be discussed further herein. For instance, if a RSA algorithm is used to sign the hash, a private key is used to encrypt the hash to form the digital signature, which is then decrypted by a relying party using the public key associated with the RSA private key. However, the template identifier 204 within the biometric reference template that uniquely identifies the biometric reference template 202 can be cryptographically bound to the privacy policy attribute 210 using other methods, such as a Message Authentication Code (MAC) or encryption. Accordingly, the privacy policy associated with the biometric reference template indicates the level of protection required for the biometric data and/or information contained in the biometric reference template and its proper and intended use. Referring to FIG. 3, in an embodiment, the privacy policy attribute 210 may be placed in the biometric reference template itself, such that the privacy policy attribute information is read along with the biometric data contained in the biometric reference template 202. Again, the biometric reference template 202 containing the privacy policy attribute 210 need not be signed when used in a context in which a trust relationship has been established. However, when trust by a third party is needed, the hash 226 of the biometric reference template containing the privacy policy attribute is signed (using an authentication tool 118 as shown in FIG. 1) and is included in the biometric reference template as a component of the signed privacy policy attribute, which notifies a relying party that there is a privacy policy associated with the biometric reference template. When the signature is validated and trust in the signed information is established, the relying party is assured that the privacy policy is for the given biometric reference template, since the signature 222 covers the hash 226 of the biometric reference template 202 which includes the privacy policy attribute 210 and the relying party can compare this signed hash to ensure that the hash is identical to a hash the relying party computes over the biometric reference template that contains the privacy policy attribute.

Figure 4A:
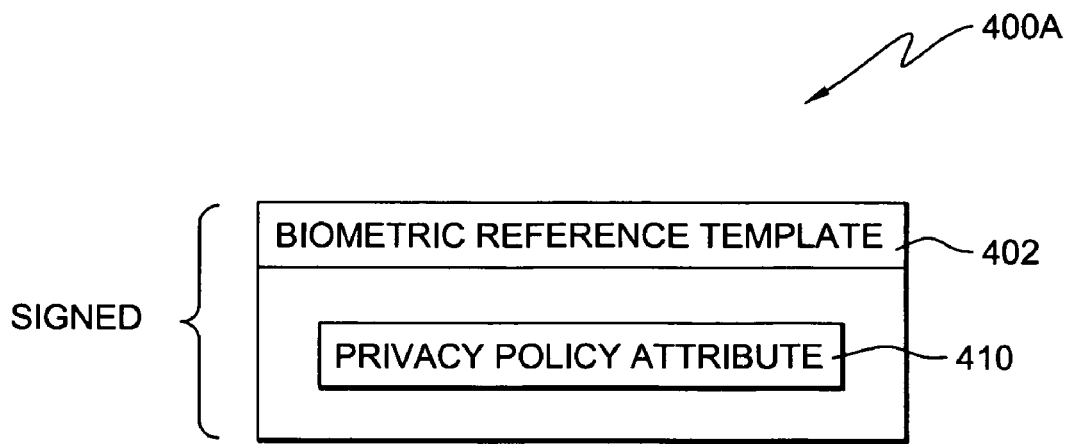
FIGS. 4A-4C are block diagrams depicting different embodiments for cryptographically binding a privacy policy attribute to a biometric reference template, in accordance with embodiments of the present invention.
Figure 4B:
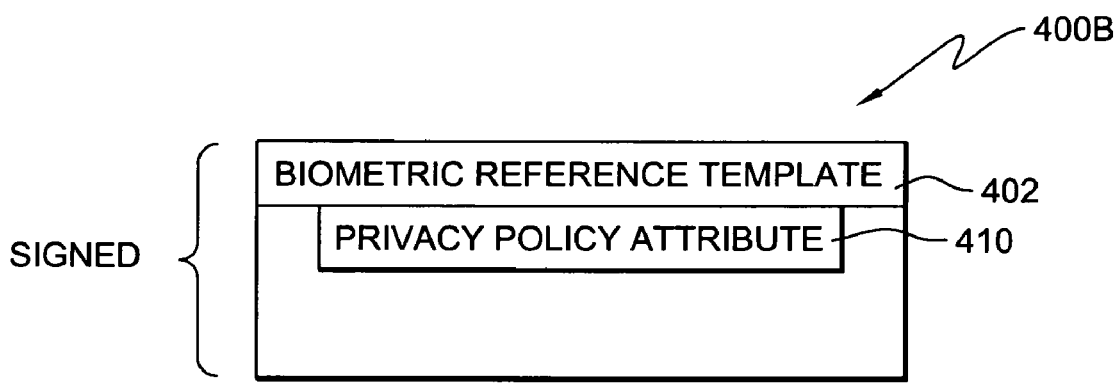
Figure 4C:
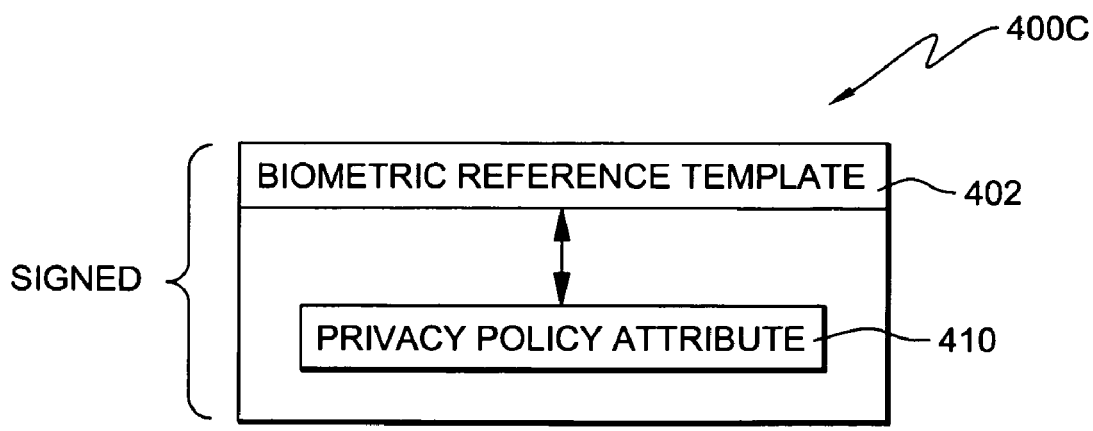

Reference is now made to FIGS. 4A-4C, which depict different embodiments for signing together a biometric reference template and a privacy policy attribute, in accordance with embodiments of the present invention. As shown in FIG. 4A, reference numeral 400A, the biometric reference template 402 includes the privacy policy attribute 410, such that, when the biometric reference template is signed the privacy policy attribute is part of the hash computed for the biometric reference template 402. Further, as shown in FIG. 4B, reference numeral 400B, the privacy policy attribute 410 is appended to the biometric reference template 402, whereas, in FIG. 4C, reference numeral 400C, the privacy policy attribute 410 is totally disjoint from the biometric reference template 402. In the embodiments shown in FIG. 4B and 4C, a hash is computed for the biometric reference template and a hash is computed for the privacy policy attribute and then the two hashes are signed to cryptographically bind the privacy policy attribute 410 to the biometric reference template 402. As such, in the embodiments shown in FIGS. 4B and 4C, the signature is a detached signature that allows an existing biometric reference template to be signed with no negative impact on their processing by already deployed systems that do not anticipate signature processing or the presence in the template of an attribute.

Figure 5:
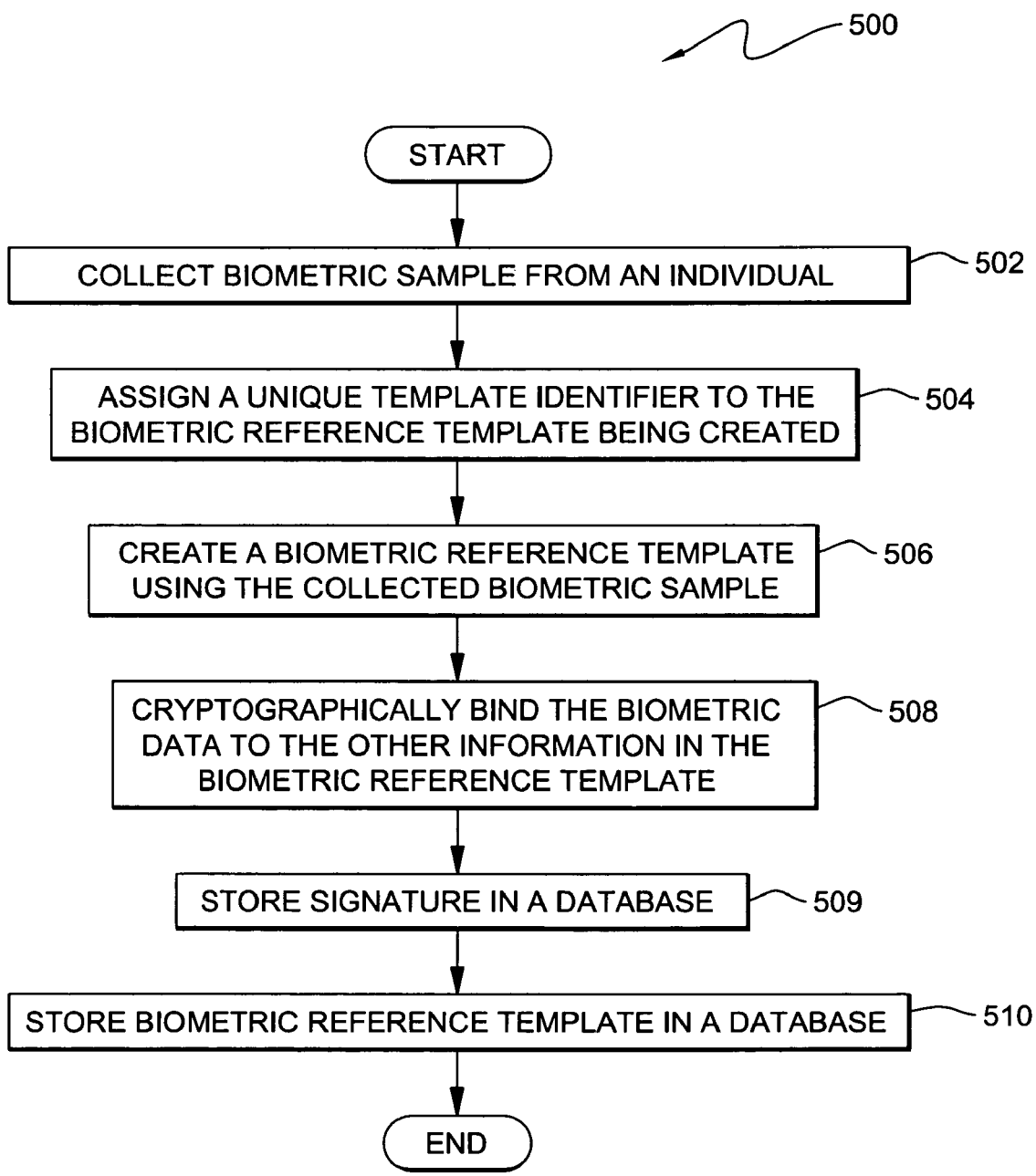
FIG. 5 depicts a flowchart outlining the steps for creating a biometric reference template using a biometric sample collected from a person or individual, in accordance with an embodiment of the present invention.

In another embodiment, the invention provides a method for controlling dissemination and use of biometric data contained in a biometric reference template, in accordance with an embodiment of the invention. Turning to FIG. 5, reference numeral 500, depicts a flowchart outlining the steps for generating a base biometric reference template or simply biometric reference template using a biometric sample collected from a user or individual in accordance with an embodiment of the invention. Referring to FIG. 5, the process begins with a biometric application within a biometric reader or scanner device collecting in step 502 a biometric sample from an individual to create a base biometric reference template within the computer system. In step 504, a unique biometric reference template identifier is assigned to the base biometric reference template being created and the biometric reference template is created in step 506 using the biometric sample collected from the individual. In step 508, the biometric application cryptographically binds the biometric data to the other information in the biometric reference template using a digital signature. In an embodiment, the digital signature is attached or appended to the biometric reference template. In another embodiment, the digital signature is detached from the biometric reference template. Regardless, the digital signature is stored in a database in step 509. Further, the signed biometric reference template is stored in a database in step 510, ending the process.

Figure 6A:
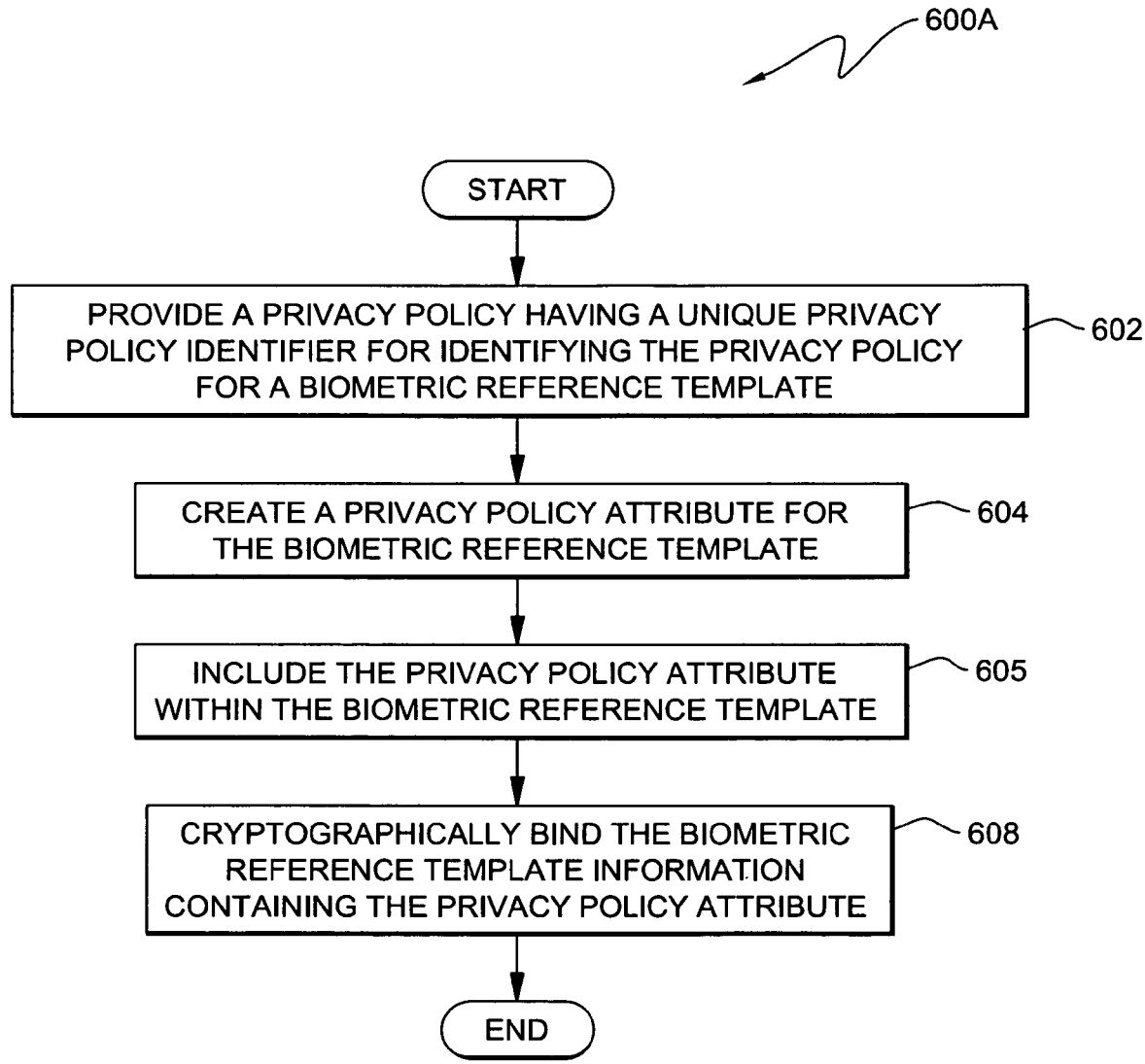
FIGS. 6A-6C depict flowcharts outlining the steps for cryptographically binding a privacy policy attribute to a biometric reference template, in accordance with various embodiments of the present invention.
Figure 6B:
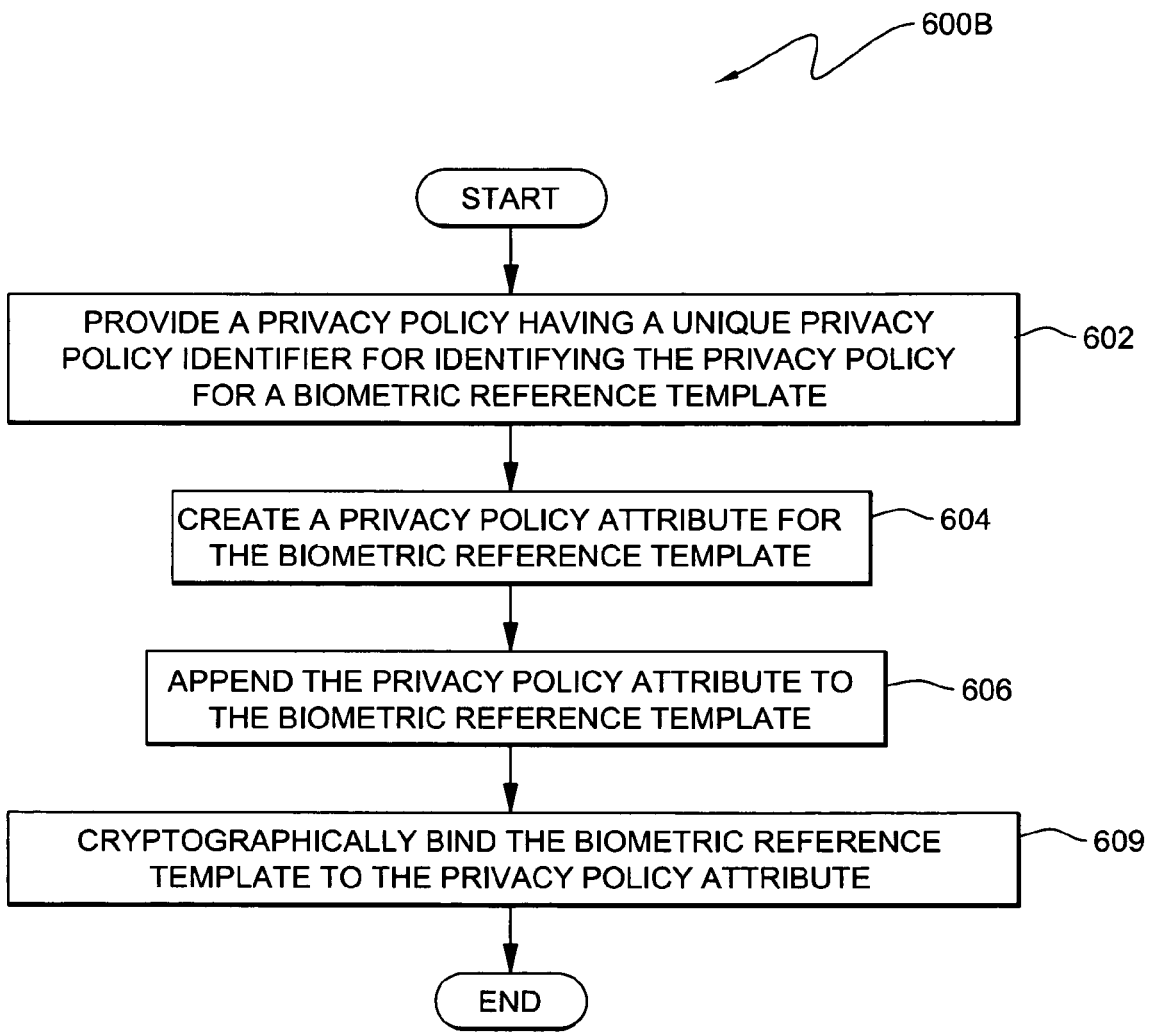
Figure 6C:
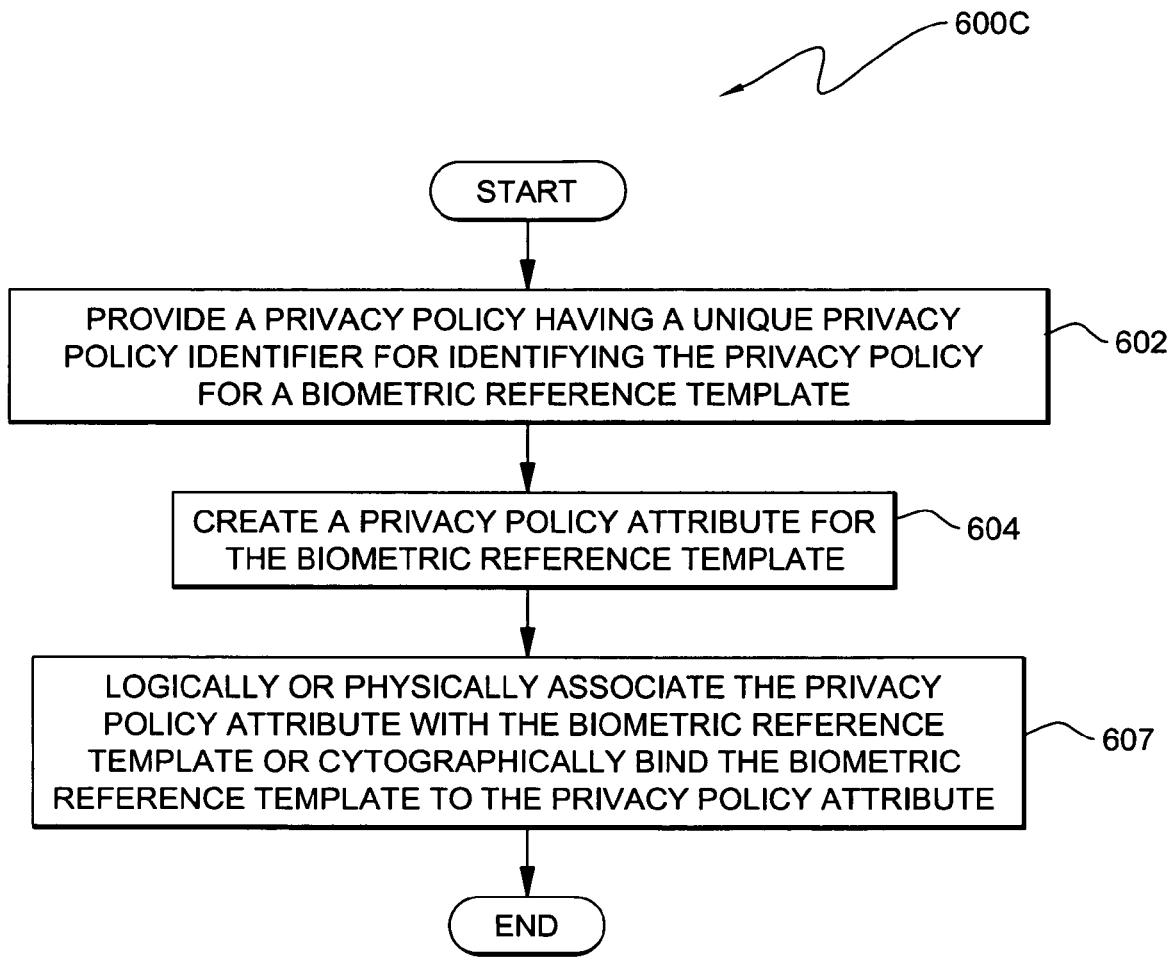

Reference is now made to FIGS. 6A-6C, which depict flowcharts outlining the steps for cryptographically binding a privacy policy attribute to a biometric reference template, in accordance with various embodiments of the present invention. In particular, FIG. 6A depicts the steps for cryptographically binding a privacy policy attribute to a biometric reference template for the embodiment shown in FIG. 4A, whereas, FIG. 6B depicts the steps for cryptographically binding a privacy policy attribute to a biometric reference template for the embodiment shown in FIG. 4B, and further where FIG. 6C depicts the steps for cryptographically binding a privacy policy attribute to a biometric reference template for the embodiment shown in FIG. 4C. As such, steps that are the same in each of FIGS. 6A, 6B and 6C are labeled with the same reference numerals. Turning to FIG. 6A, reference numeral 600A, the method begins with providing, in step 602, a privacy policy having a unique privacy policy identifier for identifying the privacy policy for a biometric reference template. Further, in step 604, the biometric application creates a privacy policy attribute for the biometric reference template, using an attribute tool or program. In an embodiment, the biometric application includes in step 605 the privacy policy attribute within the biometric reference template itself as shown in FIG. 4A. Further, in step 608, the biometric application cryptographically binds, using the authentication tool, the biometric reference template information containing the privacy policy attribute, ending the process. Turning to FIG. 6B, reference numeral 600B, the method begins with providing, in step 602, a privacy policy having a unique privacy policy identifier for identifying the privacy policy for a biometric reference template. Further, in step 604, the biometric application creates a privacy policy attribute for the biometric reference template, using an attribute tool or program. In an embodiment, the biometric application appends in step 606 the privacy policy attribute to the biometric reference template as shown in FIG. 4B. Further, in step 609, the biometric application cryptographically binds, using the authentication tool, the biometric reference template to the privacy policy attribute, ending the process. Turning to FIG. 6C, reference numeral 600C, the method begins with providing, in step 602, a privacy policy having a unique privacy policy identifier for identifying the privacy policy for a biometric reference template. Further, in step 604, the biometric application creates a privacy policy attribute for the biometric reference template, using an attribute tool or program. In an embodiment, in step 607, the biometric application logically or physically associates the privacy policy attribute with the biometric reference template as shown in FIG. 4C or cryptographically binds the biometric reference template to the privacy policy attribute, ending the process.

Figure 7:
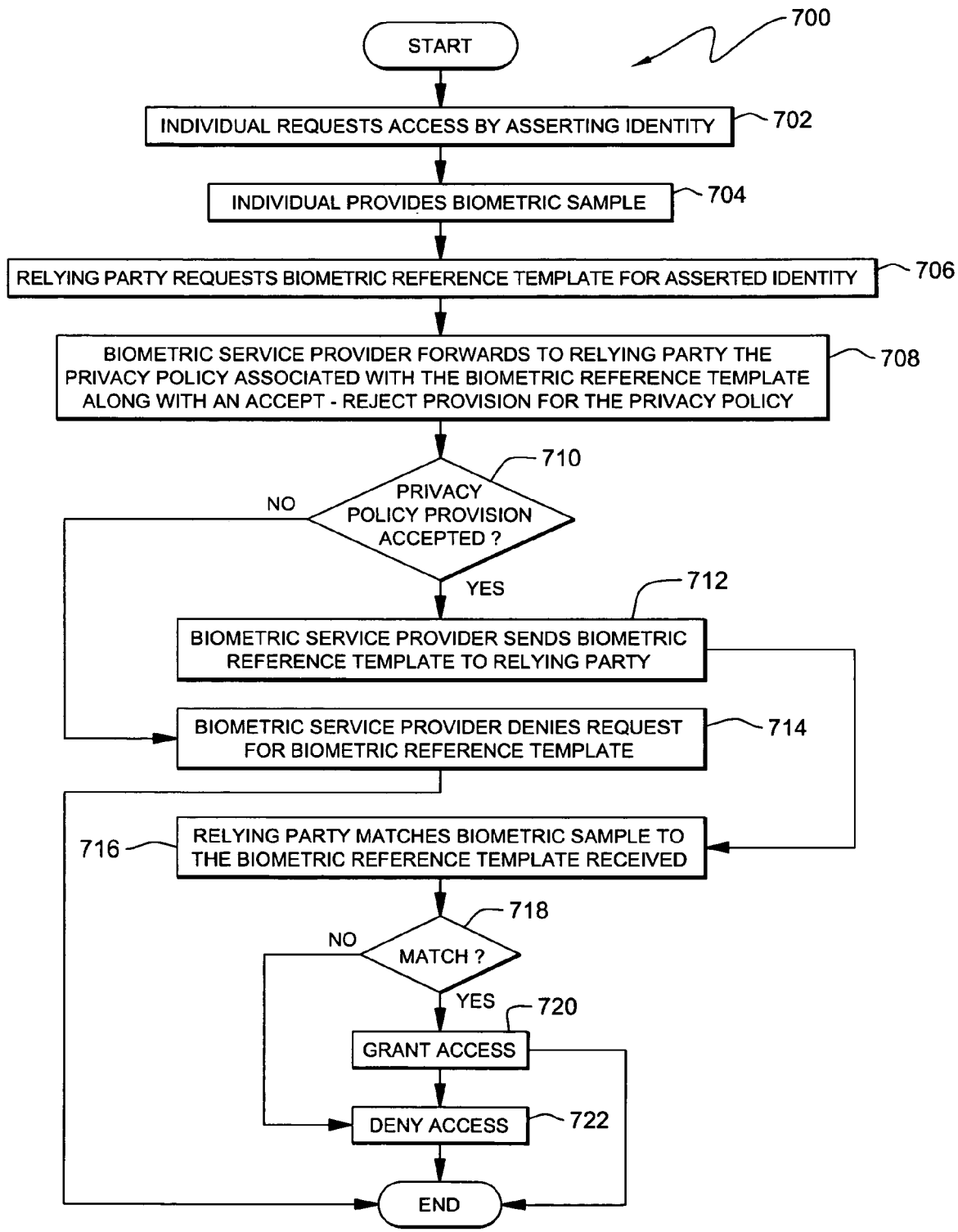
FIG. 7 depicts a flowchart outlining the steps for processing a request from a relying party seeking access to an individual's biometric reference template that has a privacy policy associated with it, in accordance with an embodiment of the present invention.

Turning to FIG. 7, reference numeral 700 depicts a flowchart outlining the steps for processing a request from a relying party seeking access to an individual's biometric reference template that has a privacy policy associated with it, in accordance with an embodiment of the present invention. The method begins in step 702 with an individual requesting access to some resource by asserting his or her identity. The individual provides a biometric sample in step 704. The relying party requests the biometric reference template for the asserted identity from a biometric service provider in step 706. The biometric service provider retrieves or obtains the biometric reference template corresponding to the individual whose identity is asserted. Upon obtaining the biometric reference template, the biometric service provider is able to see from the information contained in the biometric reference template that there is a privacy policy associated with the biometric reference template. As such, the biometric service provider retrieves the privacy policy and forwards the privacy policy associated with the biometric reference template to the relying party in step 708, along with an accept-reject provision for the privacy policy. The relying party receives the privacy policy along with the accept-reject provision for the privacy policy and, as such, the relying party requesting the individual's biometric reference template has to decide whether or not to accept or reject the privacy policy provision. As such, a determination is made by the computer system in step 710 as to whether or not the privacy policy provision has been accepted by the relying party or the entity requesting the biometric reference template. If the computer system determines that the privacy policy provision has been accepted, then the biometric service provider sends the biometric reference template to the relying party in step 712. On the other hand, if the computer system determines that the privacy policy provision has not been accepted in step 710, then the biometric service provider denies the relying party's request for the biometric reference template in step 714, ending the process. In step 716, the relying party matches the biometric sample to the biometric reference template received. Further, the biometric application within the computer system determines in step 718 whether or not the biometric sample matches the biometric reference template. If the biometric sample matches the biometric reference template in step 718, then the individual is granted access in step 720. However, if the biometric sample does not match the biometric reference template in step 718, then the individual is denied access in step 722, ending the process.

Accordingly, the invention provides a system, method and a program product for communicating a privacy policy associated with data and information stored on a biometric reference template corresponding to an individual, in accordance with an embodiment of the invention. The invention facilitates effective biometric information security management, since it helps organizations that are exposed to risk of non-compliance with privacy laws and regulations manage the privacy of the information contained in biometric reference templates. As such, the invention may be used in an identity management, identification, authentication, or authorization system that incorporates the use of biometric reference templates. For instance, a biometric service provider could define in a biometric reference template a privacy policy attribute that contains a privacy policy for communicating the intended and proper handling and use of the information contained in the biometric reference template.

The foregoing descriptions of specific embodiments of the present invention have been presented for the purpose of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for communicating a privacy policy associated with a biometric reference template, said method comprising:

assigning in a first attribute a first identifier, said first identifier uniquely identifying a biometric reference template created for a type of biometric data collected, said biometric reference template comprising the biometric data, said biometric data being a digital form of a biometric sample collected from a part of an individual's body, said assigning the first identifier being performed by a processor of a computer system;

said processor defining in a second attribute a second identifier, said second identifier uniquely identifying a privacy policy that indicates a level of protection to be provided by a relying party requesting access to said biometric reference template, said second identifier including an accept-reject provision for said privacy policy for controlling proper use and handling of said biometric data;

said processor cryptographically binding said biometric reference template to said privacy policy; and said processor transmitting, responsive to a request received from said relying party, said second identifier along with an accept-reject provision for said privacy policy associated with said biometric reference template for controlling said proper use and handling of said biometric data, wherein based on a response received from said relying party to said accept-reject provision for said privacy policy, said biometric reference template is either transmitted or not transmitted to said relying.

2. The method of claim 1, wherein the biometric reference template further comprises the first attribute and the second attribute.

3. The method of claim 2, wherein the biometric reference template further comprises a biometric type identifier that identifies the type of the biometric data specific to the part of the individual's body.

4. The method of claim 2, wherein said cryptographically binding comprises:
   computing a cryptographic hash over the entire biometric reference template to generate a hashed biometric reference template; and
   digitally signing the hashed biometric reference template to generate a digital signature of the biometric reference template, which cryptographically binds together every component within the biometric reference template.

5. The method of claim 4, said method further comprising:
   said processor attaching the digital signature to the biometric reference template.

6. The method of claim 4, said method further comprising:
   said processor storing the digital signature in a database of the computer system.

7. The method of claim 2, wherein the biometric data is stored in a database of the computer system.

8. A process for deploying computing infrastructure comprising integrating computer-readable program code into a computer system, wherein said program code in combination with said computer system is capable of performing a process for controlling dissemination and use of biometric data, said program code being stored in a computer readable hardware storage device of the computer system, said process comprising:
   assigning in a first attribute a first identifier, said first identifier uniquely identifying a biometric reference template created for a type of biometric data collected, said biometric reference template comprising the biometric data, said biometric data being a digital form of a biometric sample collected from a part of an individual's body, said assigning the first identifier being performed by a processor of a computer system;
   said processor defining in a second attribute a second identifier, said second identifier uniquely identifying a privacy policy that indicates a level of protection to be provided by a relying party requesting access to said biometric reference template, said second identifier including an accept-reject provision for said privacy policy for controlling proper use and handling of said biometric data;
   said processor cryptographically binding said biometric reference template to said privacy policy; and
   said processor transmitting, responsive to a request received from said relying party, said second identifier along with an accept-reject provision for said privacy policy associated with said biometric reference template for controlling said proper use and handling of said biometric data, wherein based on a response received from said relying party to said accept-reject provision for said privacy policy, said biometric reference template is either transmitted or not transmitted to said relying party.

9. The process of claim 8, wherein the biometric reference template further comprises the first attribute and the second attribute.

10. The process of claim 9, wherein the biometric reference template further comprises a biometric type identifier that identifies the type of the biometric data specific to the part of the individual's body.

11. The process of claim 9, wherein said cryptographically binding comprises:
    computing a cryptographic hash over the entire biometric reference template to generate a hashed biometric reference template; and
    digitally signing the hashed biometric reference template to generate a digital signature of the biometric reference template, which cryptographically binds together every component within the biometric reference template.

12. The process of claim 11, said method further comprising:
    said processor attaching the digital signature to the biometric reference template.

13. The process of claim 11, said method further comprising:
    said processor storing the digital signature in a database of the computer system.

14. A computer system comprising a processor, a memory coupled to the processor, and a computer readable hardware storage device coupled to the processor, said storage device containing program code configured to be executed by the processor via the memory to implement a method for associating a biometric reference template with a privacy policy, said method comprising:
    said processor assigning in a first attribute a first identifier, said first identifier uniquely identifying a biometric reference template created for a type of biometric data collected, said biometric reference template comprising the biometric data, said biometric data being a digital form of a biometric sample collected from a part of an individual's body;
    said processor defining in a second attribute a second identifier, said second identifier uniquely identifying a privacy policy that indicates a level of protection to be provided by a relying party requesting access to said biometric reference template, said second identifier including an accept-reject provision for said privacy policy for controlling proper use and handling of said biometric data;
    said processor cryptographically binding said biometric reference template to said privacy policy; and
    said processor transmitting, responsive to a request received from said relying party, said second identifier along with an accept-reject provision for said privacy policy associated with said biometric reference template for controlling said proper use and handling of said biometric data, wherein based on a response received from said relying party to said accept-reject provision for said privacy policy, said biometric reference template is either transmitted or not transmitted to said relying party.

15. The computer system of claim 14, wherein the biometric reference template further comprises the first attribute and the second attribute.

16. The computer system of claim 15, wherein the biometric reference template further comprises a biometric type identifier that identifies the type of the biometric data specific to the part of the individual's body.

17. The computer system of claim 15, wherein said cryptographically binding comprises:
   computing a cryptographic hash over the entire biometric reference template to generate a hashed biometric reference template; and
   digitally signing the hashed biometric reference template to generate a digital signature of the biometric reference template, which cryptographically binds together every component within the biometric reference template.

18. The computer system of claim 17, said method further comprising:
   said processor attaching the digital signature to the biometric reference template.

19. The computer system of claim 17, said method further comprising:
   said processor storing the digital signature in a database of the computer system.

20. A computer program product, comprising a computer readable hardware storage device having a computer readable program code stored therein, said program code configured to be executed by a processor of a computer system to implement a method for controlling dissemination and use of biometric data, said method comprising:
   said processor assigning in a first attribute a first identifier, said first identifier uniquely identifying a biometric reference template created for a type of biometric data collected, said biometric reference template comprising the biometric data, said biometric data being a digital form of a biometric sample collected from a part of an individual's body;
   said processor defining in a second attribute a second identifier, said second identifier uniquely identifying a privacy policy that indicates a level of protection to be provided by a relying party requesting access to said biometric reference template, said second identifier including an accept-reject provision for said privacy policy for controlling proper use and handling of said biometric data;
   said processor cryptographically binding said biometric reference template to said privacy policy; and
   said processor transmitting, responsive to a request received from said relying party, said second identifier along with an accept-reject provision for said privacy policy associated with said biometric reference template for controlling said proper use and handling of said biometric data, wherein based on a response received from said relying party to said accept-reject provision for said privacy policy, said biometric reference template is either transmitted or not transmitted to said relying party.

21. The computer program product of claim 20, wherein the biometric reference template further comprises the first attribute and the second attribute.

22. The computer program product of claim 21, wherein the biometric reference template further comprises a biometric type identifier that identifies the type of the biometric data specific to the part of the individual's body.

23. The computer program product of claim 21, wherein said cryptographically binding comprises:
   computing a cryptographic hash over the entire biometric reference template to generate a hashed biometric reference template; and
   digitally signing the hashed biometric reference template to generate a digital signature of the biometric reference template, which cryptographically binds together every component within the biometric reference template.

24. The computer program product of claim 23, said method further comprising:
   said processor attaching the digital signature to the biometric reference template.

25. The computer program product of claim 23, said method further comprising:
   said processor storing the digital signature in a database of the computer system.

* * * * *